Feb. 21, 1933.  E. C. HEAD  1,898,051
GEAR CUTTER
Filed Feb. 27, 1930    4 Sheets-Sheet 1

INVENTOR
Ernest C. Head
BY B E Schlesinger
his ATTORNEY

Feb. 21, 1933. E. C. HEAD 1,898,051
GEAR CUTTER
Filed Feb. 27, 1930 4 Sheets-Sheet 2

INVENTOR
Ernest C. Head

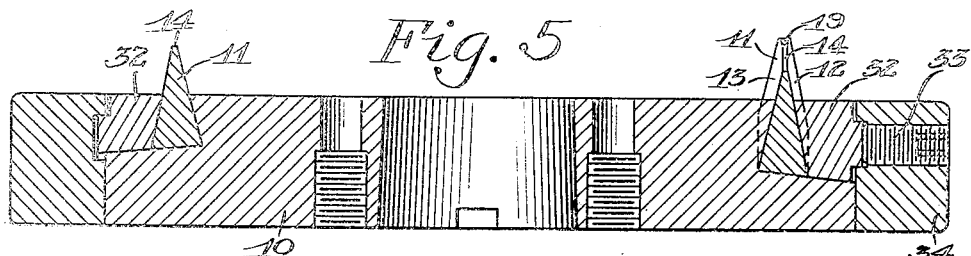
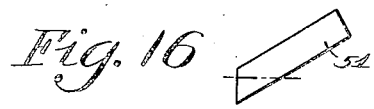
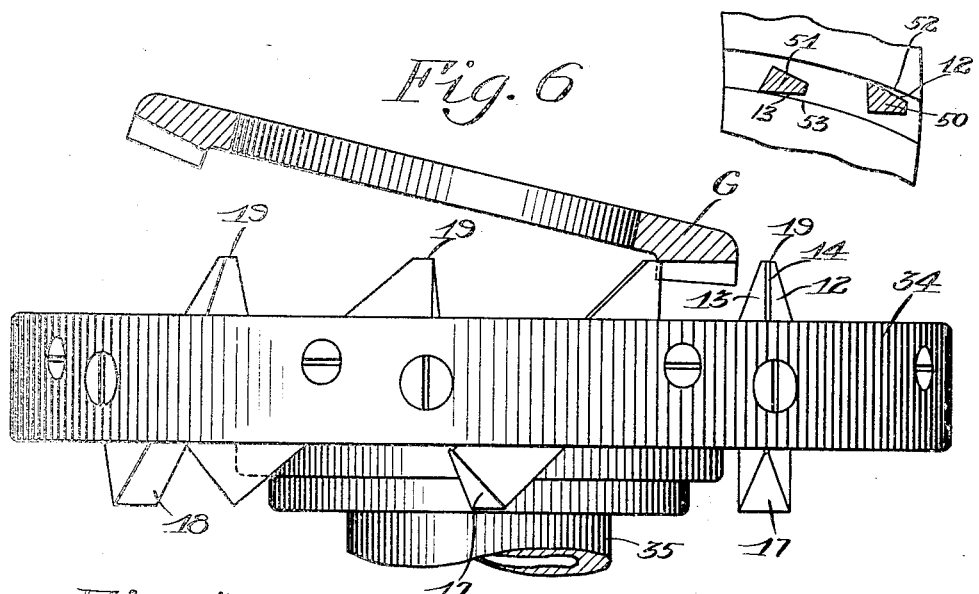
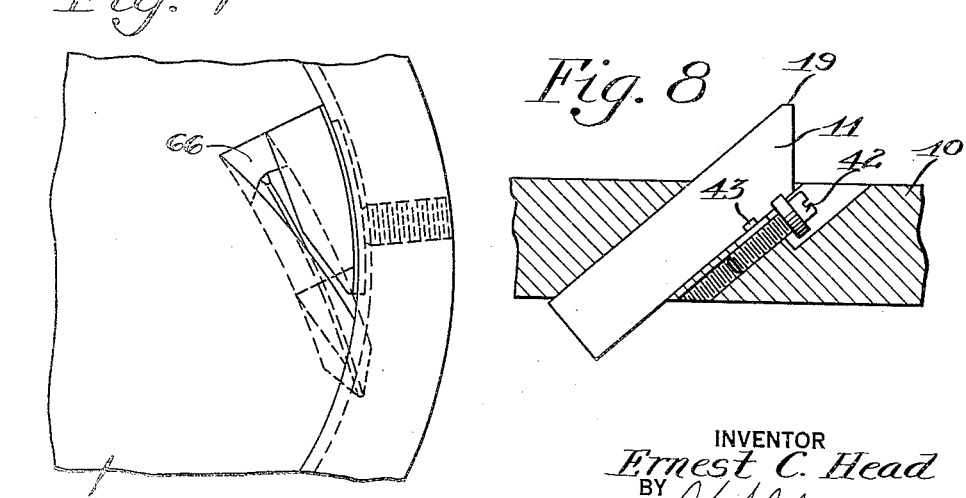

Feb. 21, 1933.  E. C. HEAD  1,898,051
GEAR CUTTER
Filed Feb. 27, 1930  4 Sheets-Sheet 4
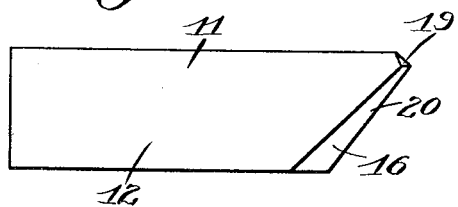
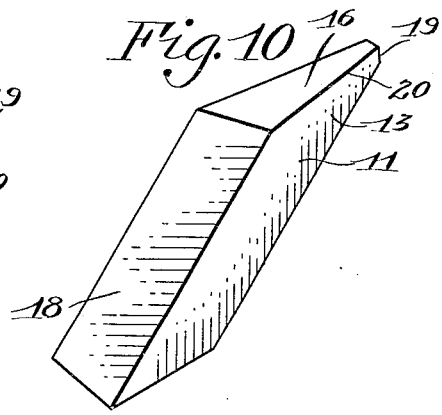
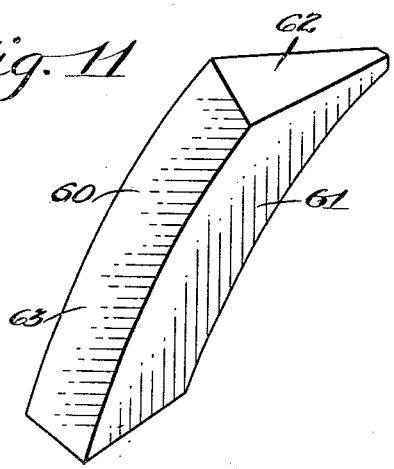
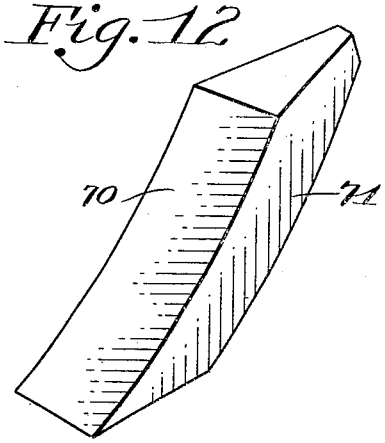
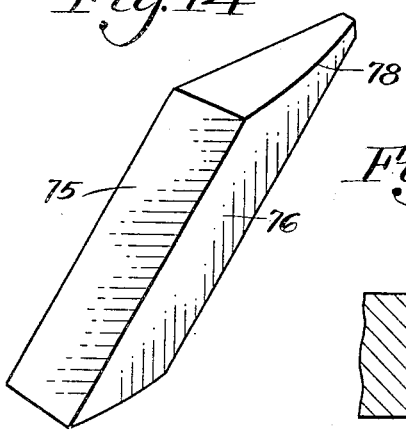
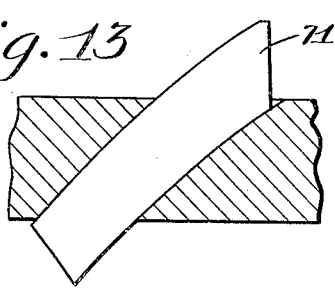
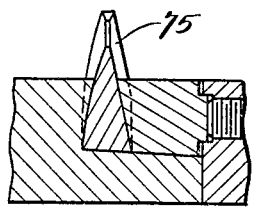
INVENTOR
Ernest C. Head
BY
his ATTORNEY Patented Feb. 21, 1933

1,898,051

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

GEAR CUTTER

Application filed February 27, 1930. Serial No. 431,801.

The present invention relates to gear cutters of the face-mill type for cutting longitudinally curved tooth gears.

The primary purpose of this invention is to provide an improved form of cutter, one which can be made more accurately and one in which a simple inexpensive form of blade can be used.

A further purpose of the invention is to provide a cutter in which by means of a simple adjustment the blades can be readily adjusted initially and after sharpening.

A further object of the invention is to provide blades for a cutter of the type referred to which do not have to be relieved to provide the required cutting clearance.

A still further object of the invention is to provide a cutter head in which the blade-receiving slots can be very readily ground.

In a cutter constructed according to this invention, blades of prismoidal shape and of uniform cross-section are employed. These blades are clamped in angular slots or pockets formed in the cutter head. The base of each blade seats against one side wall of a slot and the inside of the blade against the other side wall of the slot. The inside wall of the slot is inclined to the periphery of the head and the other wall extends diagonally of the head so that each of the cutting blades is adjustable diagonally in the head, in the direction of its length. The cutting faces of the blades extend, as usual, beyond the cutter head in the direction of the axis of the cutter and are formed by grinding or milling each blade along a plane extending at an obtuse angle to the base of the blade. The blades can be clamped very rigidly in position by means of clamping blocks and screws carried on a ring which surrounds the head and blades.

A preferred form of the invention and several modifications thereof are illustrated in the accompanying drawings in which:

Figure 5 is a transverse-sectional view of the cutter;

Figure 6 is a side elevation of the same showing how it is used in cutting a spiral bevel or a hypoid gear;

Figure 7 is a fragmentary plan view showing a modified form of cutter;

Figure 8 is a fragmentary sectional view, showing one means of adjusting the cutting blades in the head;

Figures 9 and 10 are a side view and a perspective view, respectively, of a cutting blade such as shown in Figures 1, 2, 5, and 6;

Figure 11 is a perspective view of a blade such as shown in Figure 7;

Figure 12 is a perspective view of a modified form of blade;

Figure 13 is a fragmentary sectional view of a cutter showing the last named form of blade in use;

Figure 14 is a perspective view of a still further form of blade;

Figure 1:
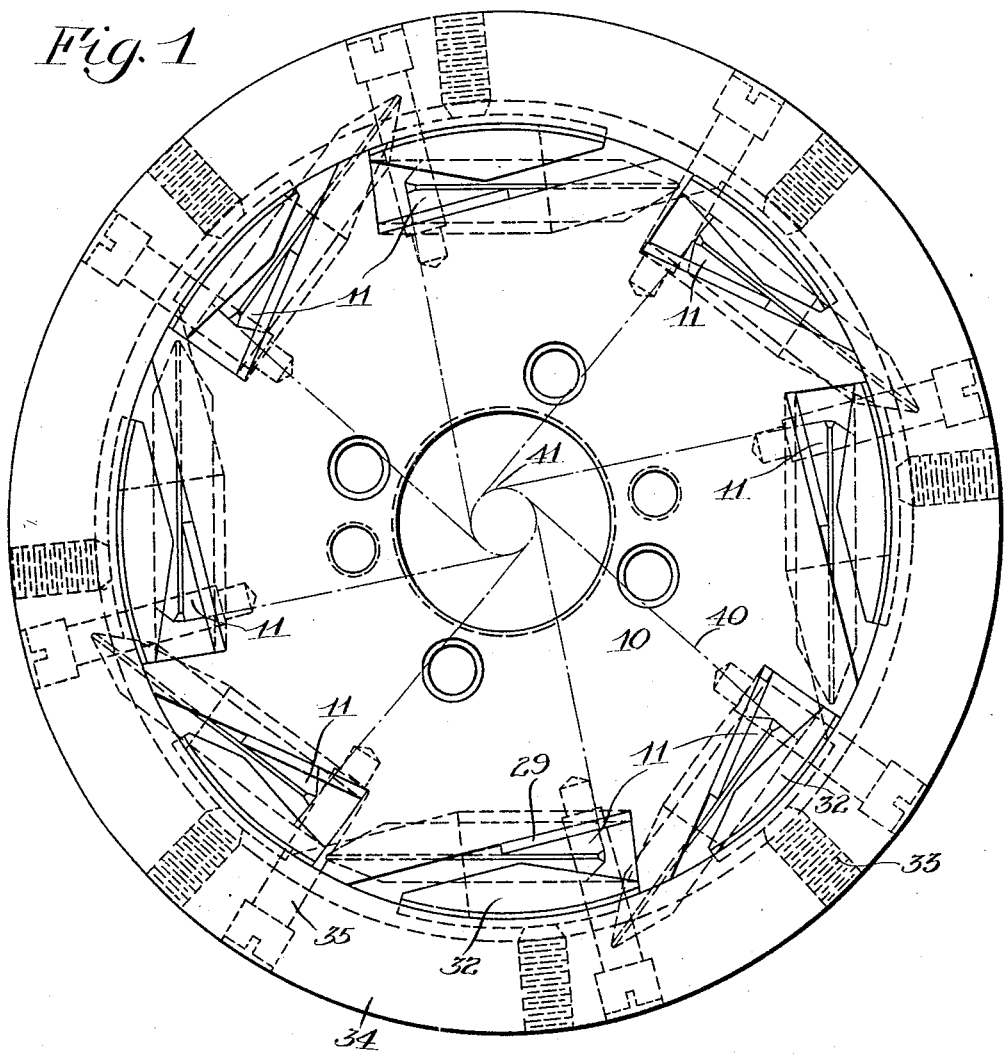
Figure 1 is a plan view of a face mill gear cutter constructed according to one embodiment of my invention.
Figure 2:
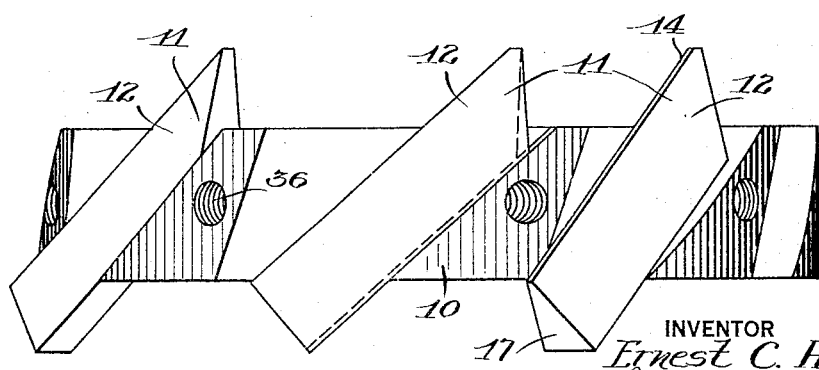
Figure 2 is a side elevation of the cutter head with blades assembled thereon but with the clamping blocks and ring removed.
Figure 3:
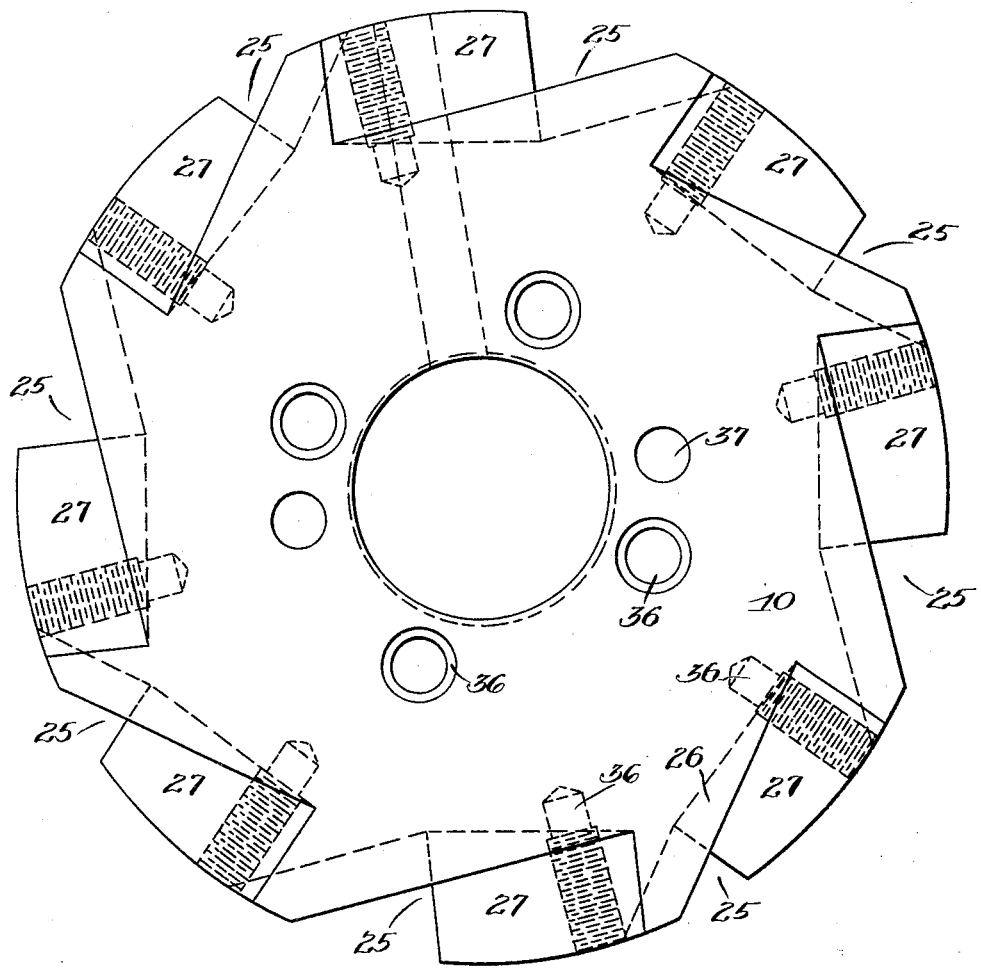
Figures 3 and 4 are a plan view and a side elevation, respectively, of the cutter head itself.
Figure 4:
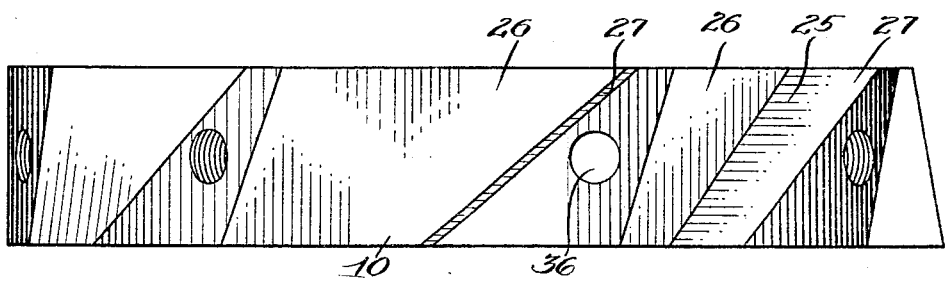

Figure 15 is a fragmentary sectional view of a cutter showing the blade of Figure 14 in use; and Figure 16 is a diagrammatic view showing the relative positions of a cutter and gear blank in the cutting of a bevel gear and illustrating why the inside walls of successive slots of the cutter head are inclined at different angles to permit of obtaining the required cutting clearance on the opposite side-cutting edges of successive blades.

Reference will be had first to Figures 1 to 6 of the drawings. 10 indicates the cutter head and 11 the cutting blades.

The cutting blades 11 are of prismoidal shape. They approximate a triangular prism in form, the sides 12 and 13 of the blades converging. Ordinarily, however, the blades are formed with a slight top land, as indicated at 14 in the drawings, so that they might be said, more properly, to approximate a tetragonal prism in shape. The cutting blades are not truly prismatic because their front faces 16 are not parallel to their rear faces 17. The front face 16 of each blade lies in a plane which forms an obtuse angle as clearly shown in Figures 2, 9 and 10, with the base 18 of the blade.

Each of the cutting blades might be made so that it had both an inside and an outside cutting edge. In practice, however, it has been deemed preferable to provide successive blades with opposite side cutting edges and to this end, the front face 16 of each blade is inclined at an acute angle to one side of the blade to form the cutting edge of that blade. The front face forms an acute angle with the outside face 12 for an outside cutting blade and with the inside face 13 for an inside cutting blade. The blade shown in Figures 9 and 10 of the drawings has an inside cutting edge 20 formed by the juncture of its front face 16 with its side face 13.

To give the required point-width, each blade is ground off at its tip as indicated at 19. The front face 16 of a blade is, therefore, trapezoidal in shape.

The blades 11 are of uniform cross-section throughout their length as clearly indicated in the drawings and they are not relieved in any way. They can be formed by milling a bar to shape or by shaping a bar of steel rolled to prismatic shape and milling or grinding the front face 16 and the tip 19 at the correct angle. Due to the elimination of the relieving operation, the blades can be made very cheaply and as they can be ground all over, if desired, a very high finish and an extremely accurate cutting tool can be obtained.

The blades are preferably made symmetrical in shape and the angle included between the sides 12 and 13 of each blade is selected so as to give the desired effective cutting pressure angle when in position on the cutter.

The cutter head 10 is disc-like or cylindrical in shape. It is formed on its periphery with a plurality of angular, generally V-shaped slots or pockets 25. The walls 26 and 27 of these slots are inclined at an angle to each other corresponding to the angle between the base 18 and the inside face 13 of the cutting blades. The inside wall 26 of each slot is inclined to the periphery of the cutter head at the angle required to give the necessary cutting clearance to the cutting blade which is mounted in that slot. This angle will be different for blades having outside cutting edges from that for blades having inside cutting edges. The reason for this will be clear hereinafter.

The inside wall 26 of each slot is, also, inclined in a vertical plane to the axis of the cutter at an angle depending upon the pressure angle of the cutting blade mounted in the slot. It will be seen that by suitably inclining the inside wall 26 of a slot to the axis of the cutter, the same cutting blade can be used in cutters of different pressure angles to cut gears of different pressure angles. Ordinarily, however, a cutter of a given pressure angle will be used and different pressure angles obtained by tilting the cutter angularly on the cutting machine.

Each blade 11 is positioned in its respective slot or pocket with its base 18 resting on the wall 27 of the slot or pocket and its side 13 either clamped against the side wall 26 of the slot or pocket or against a plate or shim 29 (Figure 1) which may be interposed between the side wall 26 of the pocket and the inside face 13 of the blade. The shims 29 are used to permit of varying the diameter of the cutter.

The blades 11 are adjusted in the direction of their length, which is diagonally of the cutter head, until their cutting edges project the required distance beyond the adjacent face of the cutter head. As this adjustment takes place along a chord of a circle circumscribed about the axis of the cutter, due to the inclination of the inside walls 26 of the pockets to the periphery of the cutter, it is possible to make slight changes in the radial setting of individual blades by means of this longitudinal adjustment so that corresponding blades of the cutter head will all operate at the required radius. Very fine adjustments can be obtained in this way but for large adjustments, it is preferred to use shims.

The blades are clamped in their adjusted positions by means of blocks 32 (Figures 1 and 5) which are held in clamping position by the screws 33 in the ring 34. This ring 34 surrounds the blades and the cutter head and is secured to the cutter head by means of bolts 35 which thread into the holes 36 formed in the cutter head. The blocks 32 are shaped to fit the outside faces 12 of the blades and the contacting walls of the cutter head and ring. As the blades are clamped into a V-shaped angle, they can be very securely and rigidly held.

After the blades have been adjusted to their correct positions and clamped in place on the cutter head, the cutter is ready for use. It can be mounted upon the cutter spindle 35 of any usual type of gear cutting machine designed to employ a face mill cutter and can be secured to the cutter spindle 35 by means of bolts (not shown) that are passed through the holes 36 in the cutter head and thread into the head of the cutter spindle. Back-off screws may be used to removed the cutter head from the cutter spindle. These are not shown in the drawings but may be threaded into the holes 37 in the cutter head.

In use, the cutter is rotated in engagement with the gear blank to be cut. Figure 6 shows a cutter operating upon a bevel gear blank G. As the cutter rotates in engagement with the blank, successive blades operate upon opposite sides of a tooth space of the blank where, as in the drawings, the blades employed are successively inside and outside cutting blades. The cutting blades may be arranged so that they all operate upon the same tooth space in a revolution of the cutter as is the case with the cutter of the Gleason Patent No. 1,236,834 of August 14, 1917 or they may be arranged so that successive blades or successive groups of blades operate successively on different tooth faces or spaces of the blank, as is the case with the cutter of the Gleason, et al. Patent No. 1,249,378 of December 11, 1917. In the first case, the cutting blades will be arranged so that their cutting edges are radial of the cutter axis. In the second case, the cutting blades are positioned so that the cutting edges are offset from the cutter axis. The second type of cutter is illustrated in the drawings. Here the cutting edges project into lines 40 tangent to a circle 41 circumscribed about the axis of the cutter as shown in Figure 1 of the drawings. In the first case, a tooth space is completely cut and then the cutter withdrawn and the blank indexed. In the second case, the blank rotates continuously and is indexed automatically by reason of the rotation of the blank between cutting engagement of successive blades or successive groups of blades.

After sharpening, the blades are advanced longitudinally in the cutter head to maintain their original correct position. This adjustment, or the adjustment initially required to set the cutter up correctly, can be made by loosening up on the clamping blocks 32 and tapping the lower ends of the blade or some special adjusting means can be provided, such as shown in Figure 8. Here a headed screw is threaded into the cutter head 10 adjacent each of the pockets 25. The heads of these screws engage in one of a series of recesses or kerfs 43 formed in the base 18 of each blade and by turning the corresponding screw each blade can be adjusted accurately.

Figure 16 is a sectional view such as might be taken in a plane tangent to the pitch surface of the blank when the cutter is inoperative engagement with the blank. It will be seen that due to the fact that the body of each cutting blade is inclined downwardly from its cutting face, cutting clearance for the cutting edge is automatically provided without there being any necessity for relieving the blade. By inclining the inside walls 26 of each pocket which receives an outside cutting blade 50 at a suitable angle to the periphery of the cutter head, a suitable clearance angle can be maintained between the side wall 12 of the cutting blade and the side 52 of the tooth being cut thereby. Likewise, by inclining the side walls 26 of each pocket, which receives an inside blade 51, at the proper angle to the periphery of the cutter head, suitable cutting clearance can be maintained between the inside wall 13 of the cutting blade and the side 53 of the tooth being cut thereby. It is to be noted that if a symmetrical blade is used, and the same clearance angle is to be maintained on both inside and outside cutting edges that the walls 26 of the pockets for the inside blades must be inclined to the periphery of the head at a different angle from the walls 26 of the pockets for the outside blades.

Various modifications can be made in the form of cutting blades within the scope of this invention. Figures 7 and 11 show one such modification. Here the blade 60 is curved longitudinally. Its sides 61 are portions of converging conical surfaces. As before, the blade is of uniform cross-section and the front cutting face 62 lies in a plane extending at an obtuse angle to the base 63 of the blade and, if the blade is to have a single cutting edge, at an acute angle to one of the sides 61 of the blade. The inside wall of the pocket 66 in the cutter head 65 which is adapted to receive the blade will be curved correspondingly to the curvature of the inside face of the blade but, as before, the two walls forming the pockets will be inclined to each other at an angle corresponding to the angle between the inside wall and the base of the blade and the inside wall will be inclined to the periphery of the cutter head 55 to give the required cutting clearance and will be inclined also to the axis of the cutter to give the required pressure angle.

Figures 12 and 13 show a still further modification of the invention. Here the base 70 and the tip surface of the blade 71 are curved on an arc of a circle. The blade is again of uniform cross-section and its cutting edge is formed as before. The bottom wall of the slot or pocket in the cutter head which receives the blade is curved correspondingly on the arc of a circle.

Figures 14 and 15 show a still further modification of the invention. Here one of the side walls 76 of the cutting blade 75 is cylindrical and the other 77 is plane, though if desired, both of the side walls may be made portions of cylindrical surfaces inclined to each other. The cutting edge 78 of the blade is circular and when the blade is used in a rotary cutter the cutting edge will sweep out a surface approaching a spherical surface of revolution. With such a blade, teeth of tapering depth can be cut in bevel gears substantially without "bias bearing", that is, without a tooth surface contact which extends diagonally across the faces of the teeth. As before, the blade 75 is of uniform cross-section. The inside wall of the slot adapted to receive a blade 75 with an inside cutting edge would be a portion of a cylindrical surface but the inside wall of the pocket adapted to receive the outside blade might still be made a plane surface.

The advantages of the present invention are obvious. As the blades do not have to be relief ground, they can be made much more cheaply than the relieved blades which have heretofore been required. The blades can be milled to shape and then ground or by rolling the steel to the proper shape a further material saving in blade cost can be secured. Due to the V-shape of the slots or pockets in the cutter head, these slots or pockets can be ground very accurately to the required dimensions and angles thereby increasing the accuracy of the cutter. At the same time, due to the angular shape of these slots or pockets, the blades can be clamped very securely in the cutter head and the positions of the blades in the cutter head can be controlled very accurately. As the blade is clamped against angular surfaces, it is squared up in two directions. A further advantage is that there is no weakening of the blades as they are ground back. The stock of the blade is of uniform cross-section and the same strength will be maintained until the blade is used. The blades can be trued up, that is, positioned correctly radially by moving them up and down in the cutter head. Other advantages of this construction will be obvious to those skilled in the art.

While certain particular embodiments of this invention have been described, it will be obvious that the invention is capable of still further modifications. In general, it may be said that this application is intended to cover any variations, uses or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A blade for a rotary face mill gear cutter which has converging side faces and is of uniform cross-section throughout its length and has one end face sharpened at other than a right angle to its base to provide a cutting face of generally trapezoidal shape, the shorter of the two parallel legs of the trapezoid constituting the tip cutting edge of the blades and one of the non-parallel legs of the trapezoid forming a side cutting edge.

2. A blade for a rotary face mill gear cutter which is of uniform cross-section throughout its length and which has the general shape of a triangular prism but which has its front cutting face formed by a plane oblique to its base and inclined at an acute angle to one side face to form a side cutting edge having the profile shape of a gear tooth.

3. A blade for a rotary face mill gear cutter which is of uniform cross-section throughout its length and of prismoidal shape and which has its front face inclined at an obtuse angle to its base at an acute angle to one side to form a side cutting edge having the profile shape of a gear tooth.

4. A blade for a rotary face mill gear cutter, the sides of which are portions of converging conical surfaces and the front cutting face of which is of trapezoidal shape and lies in a plane inclined at an obtuse angle to the base thereof.

5. A blade for a rotary face mill gear cutter which has converging side faces, a front cutting face of trapezoidal shape and a base formed as a surface of revolution.

6. A blade for a rotary face mill gear cutter which is of uniform cross-sectional shape throughout its length and which has converging side faces and one end face inclined to its base and side faces to provide an effective cutting contour having the profile shape of a gear tooth.

7. A gear cutter comprising a rotary head and a plurality of cutting blades which are secured thereto, each of said cutting blades having converging side faces and being of uniform cross-section throughout its length and extending beyond one side face of the head and having a cutting edge formed thereon which sweeps out a surface of revolution coaxial with the head on rotation of said head, and means for adjusting said blades diagonally of the axis of the head and along a chord of a circle circumscribed about the axis of the head.

8. A gear cutter comprising a rotary head and a plurality of cutting blades which are secured thereto, each of said cutting blades having converging side faces and being of uniform cross-section throughout its length and having one end face inclined at an obtuse angle to its base and extending beyond one side face of the head to provide a cutting face, the lateral side edges of which sweep out surfaces of revolution coaxial with the head on rotation of the head, and means for adjusting said blades diagonally of the head and along chords of a circle circumscribed about the axis of the head.

9. A rotatable gear cutter comprising a head and a plurality of blades of uniform cross-section throughout their lengths secured thereto and extending diagonally of the head, said blades being formed with side cutting edges projecting beyond the adjacent face of the head in the direction of the axis of the head and said blades being adjustable in the head in the direction of their lengths.

10. A rotatable gear cutter comprising a head having a plurality of generally V-shaped pockets formed therein, a plurality of blades, each of which is of such shape that the two sides of it which are adjacent the walls of the pockets are inclined to each other at an angle corresponding to the angle between the walls of the pockets and means for clamping the blades in their respective pockets.

11. A rotatable gear cutter comprising a head having a plurality of generally V-shaped pockets formed therein, the inside walls of which are angularly inclined to the periphery of the head and the other walls of which extend diagonally of the head, and a plurality of cutting blades, one of which is secured in each of said pockets and is adjustable therein in a direction diagonal of the cutter head.

12. A rotatable gear cutter comprising a head having a plurality of generally V-shaped pockets formed therein, the inside walls of which are angularly inclined to the periphery of the head and the other walls of which extend diagonally of said head, and a plurality of cutting blades, one of which is secured in each of said pockets so that it extends diagonally of said head, each of said blades being of generally prismoidal shape and having its front cutting faces projecting beyond the adjacent face of the head in the direction of the axis of the head and lying in a plane inclined at an obtuse angle to its base and being adjustable in said head in the direction of its length.

13. A gear cutter comprising a rotatable head having a plurality of V-shaped pockets formed therein and a plurality of cutting blades secured in said pockets with their cutting portions projecting beyond the adjacent face of the head in the direction of its axis, said blades being of prismoidal shape, the walls of each pocket being inclined to one another at an angle equal to the angle between the adjacent side and the base of the blade mounted therein and the inside wall of each pocket being further inclined to the axis of the cutter head at an angle determined by the desired pressure angle of the cutting edge of said blade.

14. A gear cutter comprising a rotatable head having a plurality of V-shaped pockets formed therein and a plurality of cutting blades secured in said pockets with their cutting portions projecting beyond the adjacent face of the head in the direction of its axis, each of said blades being of prismoidal shape, the walls of each of said pockets being inclined at an angle to one another equal to the angle between the adjacent side and the base of the blade secured therein and the inside wall of the pocket being further inclined to the periphery of the head at an angle determined by the clearance required for the cutting edge of the blade secured therein.

15. A rotatable gear cutter head having a plurality of pockets formed therein, each of said pockets having side and bottom faces inclined to the axis of the head and inclined at an acute angle to one another.

16. A gear cutter comprising a rotatable head having a plurality of V-shaped pockets formed therein, extending diagonally through the head, a plurality of cutting blades of prismoidal shape secured in said pockets and having front faces formed at an obtuse angle to their bases, respectively, to provide side cutting edges and a ring member surrounding said head and blades and provided with means for clamping said blades in said pockets.

17. A gear cutter comprising a rotatable head, a plurality of blades of uniform cross-section which extend diagonally of the head and have their cutting portions projecting beyond the adjacent face of the head in the direction of its axis, each of said blades being formed with a front face at an obtuse angle to its base and at an acute angle to one side to provide a side cutting edge and being adjustable in the direction of its length, and means for securing the blades in the head.

18. A gear cutter comprising a rotary head having a plurality of circularly arranged pockets formed therein which extend at an angle to the axis of the head, and a plurality of cutting blades which are of uniform cross-section throughout their lengths, said blades being mounted in said pockets with their cutting portions projecting beyond the adjacent side face of the head in the general direction of the axis of the head and said blades being formed so that their front faces intersect their side faces at acute angles to provide side cutting edges.

19. A gear cutter comprising a rotary head having a plurality of circularly arranged pockets formed therein which extend at an angle to the axis of the head, and a plurality of cutting blades which are of prismoidal shape and of uniform cross-section throughout their length, said blades being mounted in said pockets with their cutting portions projecting beyond the adjacent side face of the head in the general direction of the axis of the head, and said blades being formed so that their front faces intersect their side faces at acute angles to provide side cutting edges.

20. A gear cutter comprising a rotary head having a plurality of circularly arranged pockets formed therein which extend at an angle to the axis of the head, and a plurality of cutting blades which are of uniform cross section throughout their length and of generally prismoidal shape mounted in said pockets with their cutting portions projecting beyond the adjacent side face of the head in the direction of the axis of the head, said blades being formed with front faces at obtuse angles to their bases to provide side cutting edges.

21. A gear cutter comprising a rotary head and a plurality of cutting blades, each of said blades being of prismoidal shape and of uniform cross-section throughout its length, said head having a plurality of slots formed diagonally therein and shaped to receive said blades, each of said blades being arranged in its slot so that one end thereof projects beyond the adjacent side face of the head, said end of each blade being sharpened to provide a side cutting edge.

22. A gear cutter comprising a rotary head and a plurality of cutting blades, each of said blades being of prismoidal shape and of uniform cross-section throughout its length, said head having a plurality of slots formed diagonally therein and shaped to receive said blades, each of said blades being arranged in its slot so that one end thereof projects beyond the adjacent side face of the head, said end of each blade being shaped to provide a cutting face inclined to the base of the blade at an angle other than a right angle, and each blade being adjustable in its slot in the direction of its length.

23. A gear cutter comprising a rotary head having a plurality of blade-receiving slots formed diagonally therein, a plurality of cutting blades mounted in said slots, each of said blades being of uniform cross-section throughout its length and having one end sharpened to provide a cutting face, the shape of each blade being such that said face is of trapezoidal form, each of said blades being arranged in its slot so that the cutting face of the blade projects beyond the adjacent side face of the head, the shorter of the two parallel legs of the trapezoidal cutting face of the blade forming the tip cutting edge of the blade and one of the non-parallel legs forming a side cutting edge.

24. A gear cutter comprising a rotary head having a plurality of slots extending diagonally of its axis and a plurality of cutting blades each of which is of uniform cross-sectional shape throughout its length and has converging side faces, said blades being positioned in said slots to extend beyond one side face of the head so that the top-lands of the blades lie outwardly from said side face of the head, each of said blades having the end which extends beyond said head sharpened to provide an effective cutting contour, the lateral side edges of which sweep out surfaces of revolution on rotation of the head, said blades being adjustable diagonally of the head in the longitudinal direction of said slots.

25. A gear cutter comprising a rotary head having a plurality of slots extending diagonally of its axis and a plurality of cutting blades each of which is of uniform cross-sectional shape throughout its length and has converging side faces, said blades being positioned in said slots to extend beyond one side face of the head so that the top-lands of the blades lie outwardly from said side face of the head, each of said blades having the end which extends beyond said side face of the head formed at an obtuse angle to the base of the blade to provide a cutting face extending in the general direction of the axis of the head, the lateral side edges of which sweep out surfaces of revolution coaxial with the head on rotation of said head, said blades being adjustable diagonally of the head in the longitudinal direction of said slots.

26. A gear cutter comprising a rotary head having a plurality of slots extending diagonally of its axis, the bottom and one side face of which are inclined to the axis of the head, and a plurality of cutting blades, each of which is of uniform cross-sectional shape throughout its length and has converging side faces, said blades being positioned in said slots to extend beyond one side face of the head so that the top-lands of the blades lie outwardly from said side face of the head, each of said blades having the end which extends beyond said side face of the head sharpened to provide lateral side edges which sweep out surfaces of revolution coaxial with the head on rotation of the head, means for adjusting the blades in said slots in the longitudinal direction of said slots and means for securing each blade in its slot in any adjusted position.

ERNEST C. HEAD.